(12) United States Patent
Ehrick et al.

(10) Patent No.: US 6,527,196 B1
(45) Date of Patent: Mar. 4, 2003

(54) DEIONIZED WATER WASHING APPARATUS AND METHOD

(75) Inventors: Stephen D. Ehrick, Yorba Linda, CA (US); David A. Ehrick, Yorba Linda, CA (US)

(73) Assignee: Ionman Wash Systems, LLC, Yorba Linda, CA (US)

( * ) Notice: Subject to any disclaimer, the term of this patent is extended or adjusted under 35 U.S.C. 154(b) by 0 days.

(21) Appl. No.: 09/877,446

(22) Filed: Jun. 11, 2001

Related U.S. Application Data

(63) Continuation-in-part of application No. 09/415,076, filed on Oct. 12, 1999.

(51) Int. Cl.⁷ ............................................. B05B 17/00
(52) U.S. Cl. ........................ 239/1; 239/147; 239/146; 239/302; 239/722
(58) Field of Search ............................... 239/104, 146, 239/147, 722, 302, 1; 235/384; 210/266, 268, 269

(56) References Cited

U.S. PATENT DOCUMENTS

| | | | |
|---|---|---|---|
| 3,786,421 A | | 1/1974 | Wostl |
| 4,046,654 A | * | 9/1977 | Cole ............................ 205/341 |
| 4,382,862 A | * | 5/1983 | Dillman ....................... 210/668 |
| 4,395,626 A | | 7/1983 | Barker et al. |
| 4,460,465 A | * | 7/1984 | Zacharkow et al. ......... 210/266 |
| 4,764,271 A | * | 8/1988 | Acosta ......................... 210/266 |
| 5,798,271 A | * | 8/1998 | Godec et al. ................ 436/146 |
| 6,419,831 B2 | * | 7/2002 | Wang .......................... 210/668 |

* cited by examiner

*Primary Examiner*—Robin O. Evans
(74) *Attorney, Agent, or Firm*—William W. Haefliger

(57) ABSTRACT

A system to produce a high pressure stream of deionized water, for cleaning a body or bodies, comprising, in combination, a deionization bed within a first vessel, a first conduit or conduits to conduct non-deionized water at a relatively low pressure or pressures to pass through the bed to deionize the water, a primary sensor to measure the deionization level of water that has passed through the bed, a second conduit or conduits to conduct water from the bed, a pump to receive water passed by the second conduit or conduits and to pressurize said received water to a level of at least about 1,200 PSI, a nozzle connected to the pump and operable to controllably dispense a high pressure stream of deionized water for highly effective cleaning of said bodies, and a hand truck carrying said vessel, conduits, pump and nozzle for transporting same to the location of said body or bodies.

13 Claims, 6 Drawing Sheets

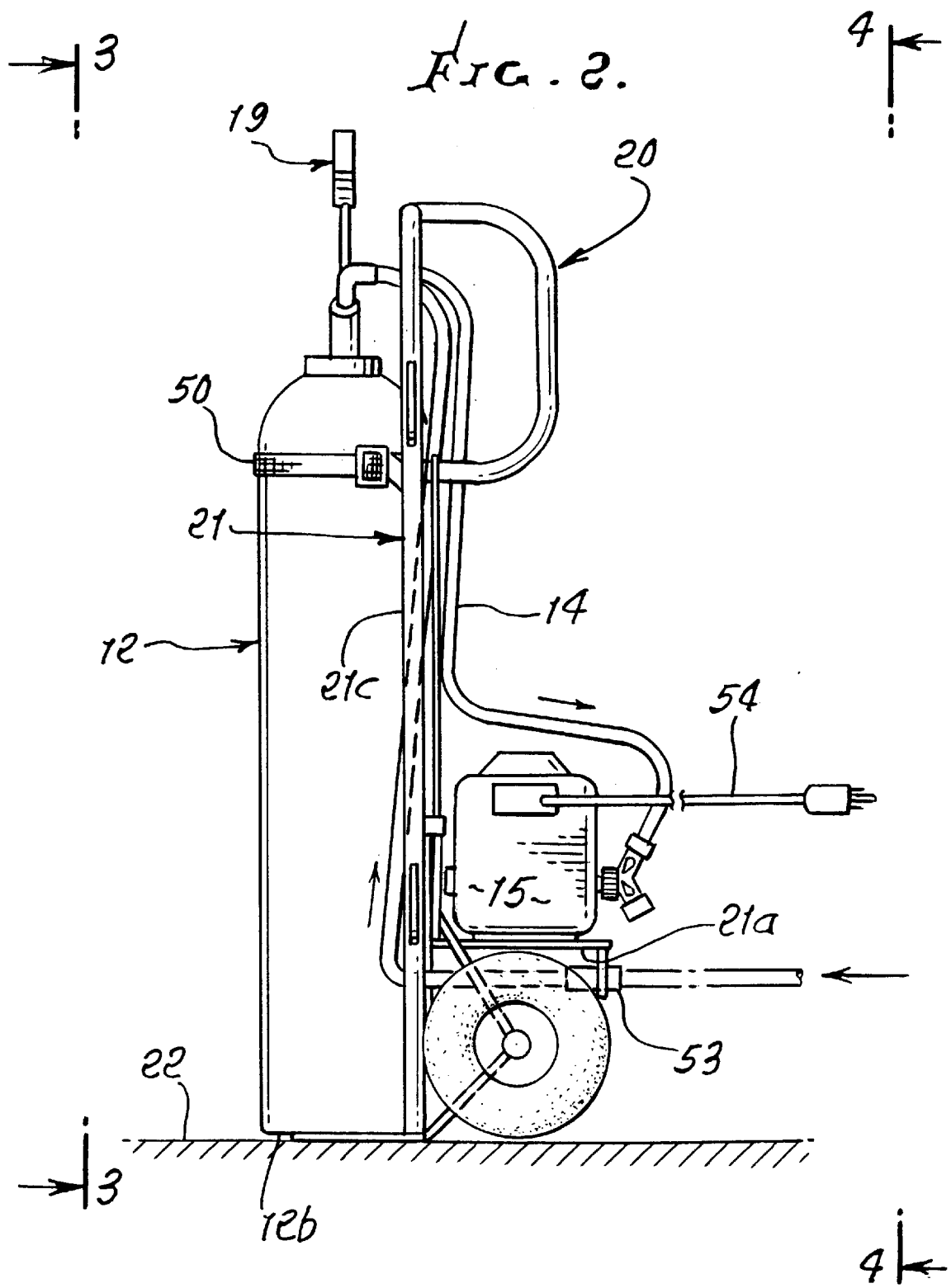

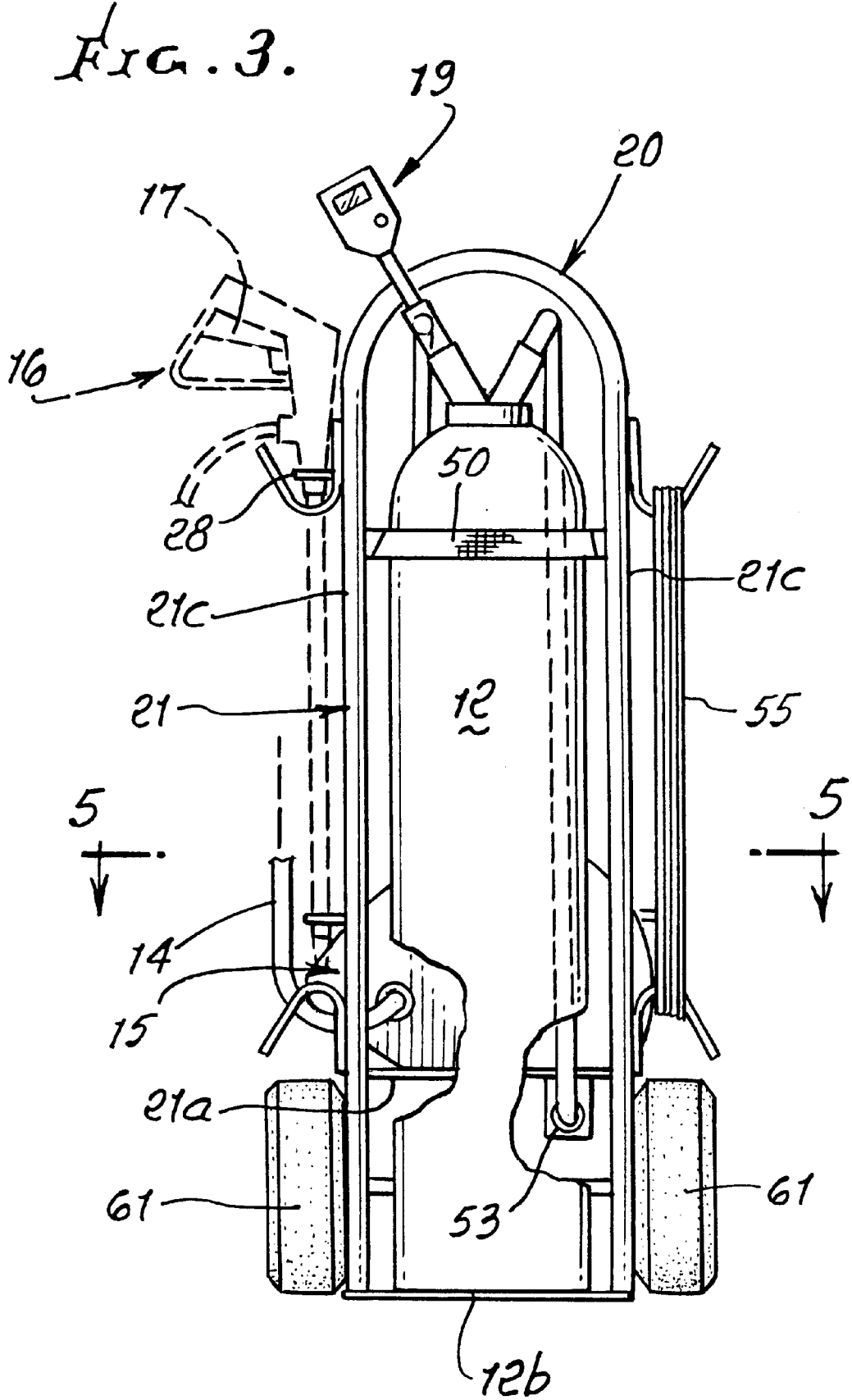

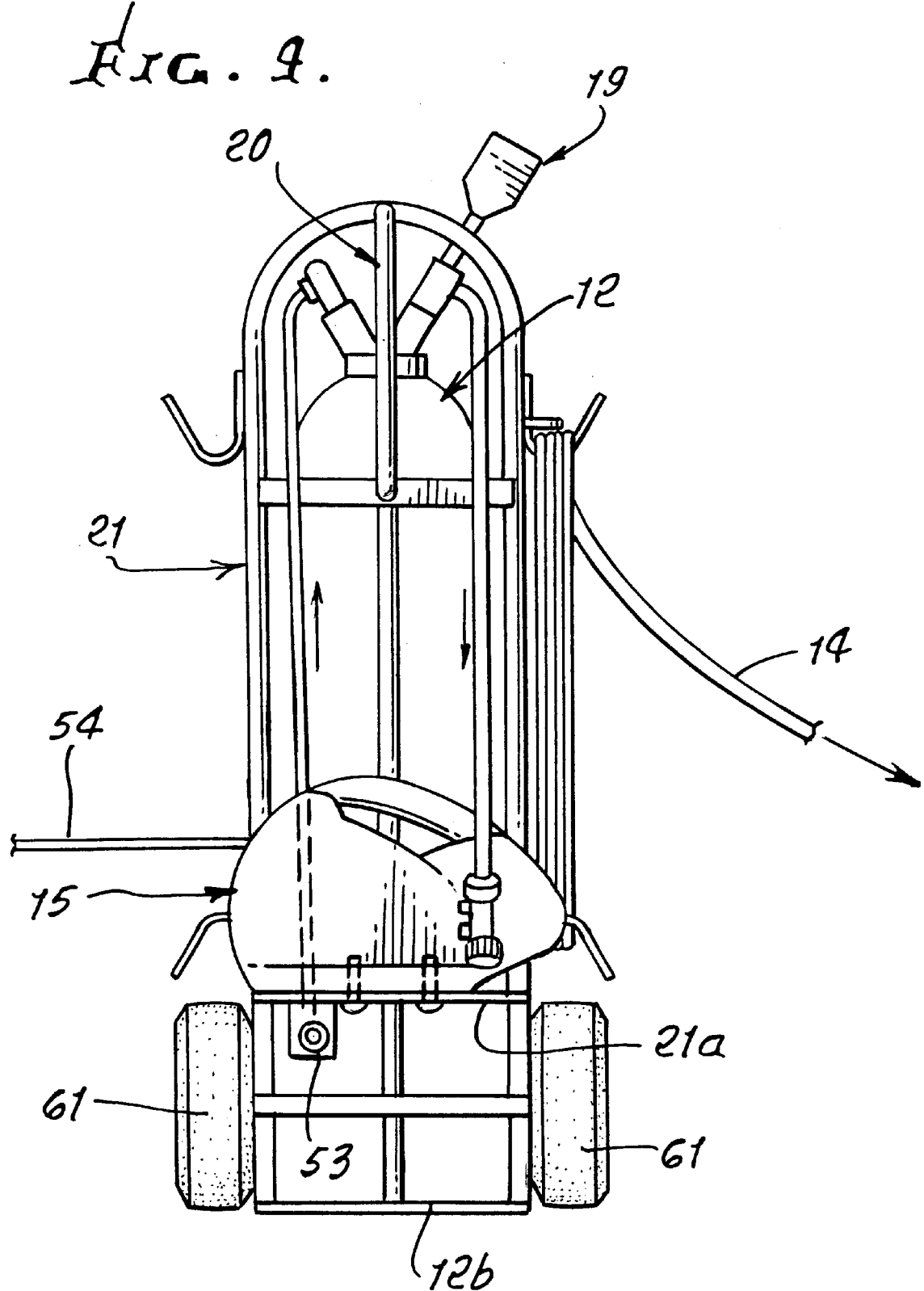

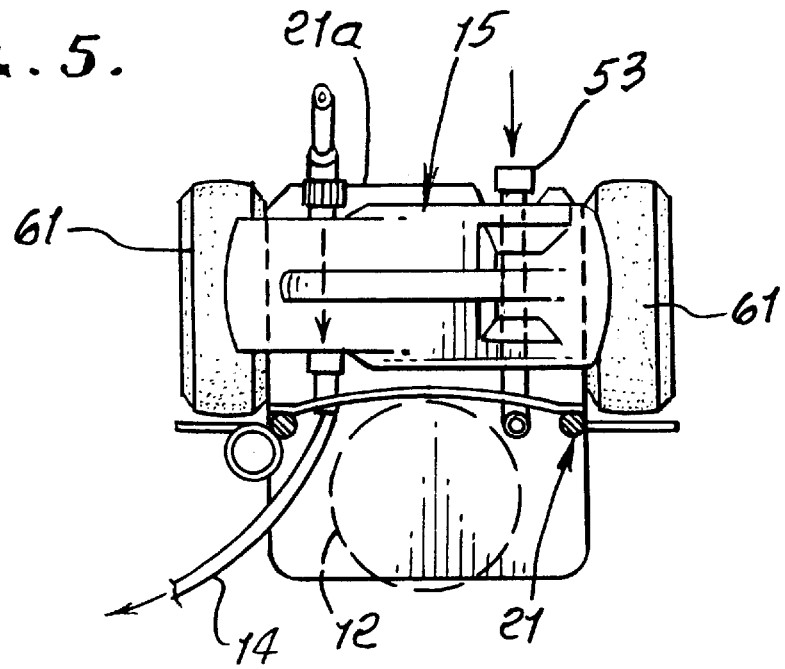
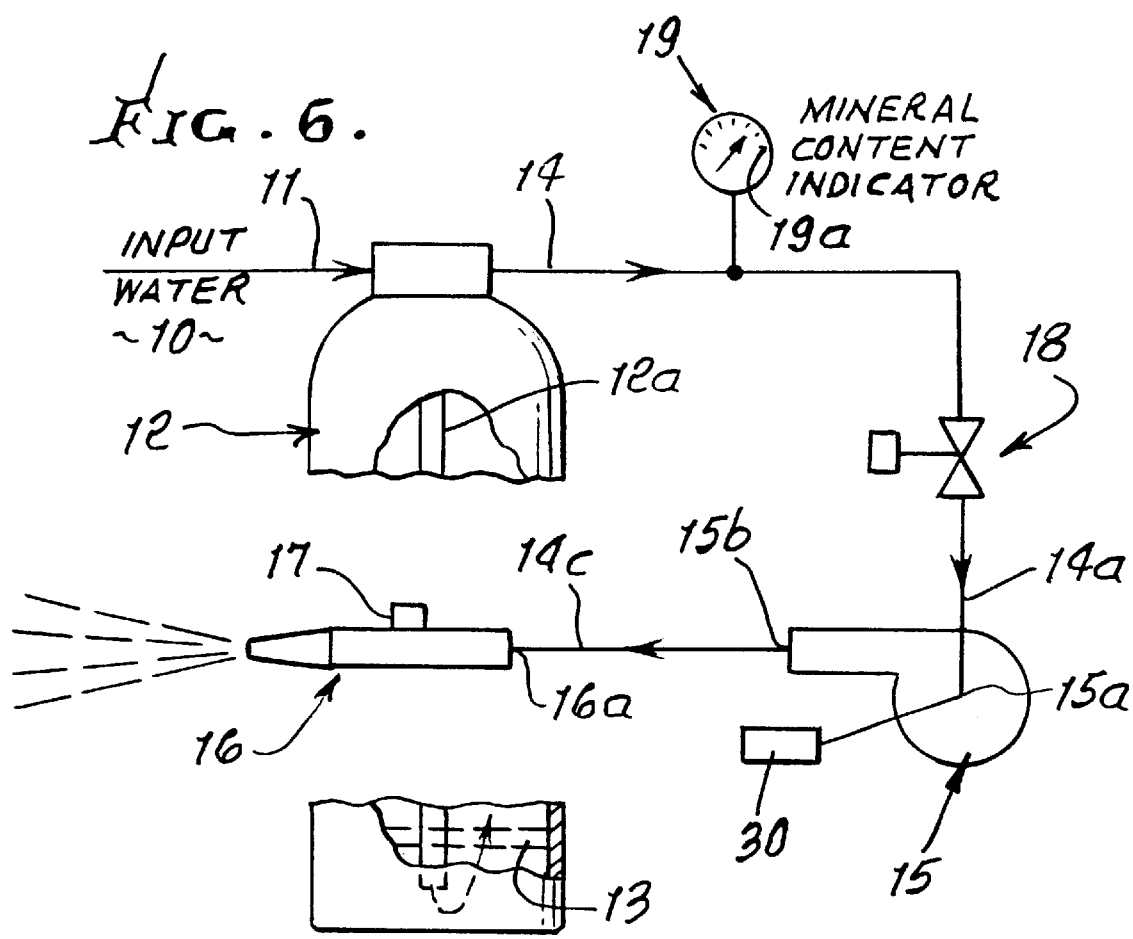

DEIONIZED WATER WASHING APPARATUS AND METHOD

This application is a continuation-in-part of Ser. No. 09/415,076, filed Oct. 12, 1999.

BACKGROUND OF THE INVENTION

This invention relates generally to wash systems, such as systems relating to vehicle washing; more particularly it concerns method and apparatus for such washing, employing deionized water.

As is known, very large numbers of vehicles such as trucks, automobiles, and boats are hand washed frequently, employing tap water at city pressure below 100 psi, and/or soaps, and/or detergents. This results in required use of millions of gallons of tap water, and tons of soaps and detergents, frequently entering storm sewer systems and water bodies receiving flow from such sewer systems.

Although efforts to reduce industrial pollution have been successful, the lack of a low cost convenient alternative to hand washing of vehicles has prevented or has limited success in this area. In fact, the lack of an acceptable alternative has been responsible for issuance of exemptions for residential vehicle washing.

SUMMARY OF THE INVENTION

It is a major object of the invention to provide improved cleaning apparatus and methods, employing a high-pressure stream or streams of de-ionized water, used in ways providing a solution or solutions to the above described problems. The use of a stream or streams of high-pressure de-ionized water, directed at vehicle surfaces, accomplishes superior cleaning, eliminates need for soap and/or detergent, enables spot-free air drying of such surfaces, and provides a time-saving incentive for the user. This also helps to eliminate the need for soap and contributes to the water usage savings associated with the present system.

Basically, the improved compact, portable system to produce a high pressure stream of deionized water, for cleaning vehicle metal bodies, comprises, in combination:

a) a deionization bed within a first vessel, b) a first conduit or conduits to conduct non-deionized water at a relatively low pressure or pressures to pass through the bed to deionized the water, c) a primary sensor to measure the deionization level of water that has passed through the bed, d) a second conduit or conduits to conduct water from the bed, e) a pump to receive water passed by the second conduit or conduits and to pressurize the received water to a level of at least about 1,200 PSI, f) a nozzle connected to the pump and operable to controllably dispense a high pressure stream of deionized water for highly effective cleaning of such bodies, g) and a hand truck carrying said vessel, conduits, pump and nozzle for transporting same to the location of said body or bodies.

As will be seen, the vessel is typically elongated upwardly, and the hand truck has a frame that extends upwardly to support said vessel, and there being wheels carrying said frame. A platform is typically provided to be integral with the frame, and the pump is carried by the platform, generally sidewardly of the upwardly elongated vessel.

A further object is to provide a flexible conduit to conduct water from the pump to the dispensing nozzle, and a receptacle carried by the assembly, as for example by the frame, to removably receive the nozzle.

Yet another object is to locate frame carrying wheels generally below pump level, when the frame extends generally vertically.

A yet further object includes provision of a method of use of the referenced apparatus, and which includes:

h) wheeling the hand truck carrying the vessel, conduits, pump and nozzle to the use location, i) orienting the hand truck frame in upright position, with the vessel located at one side of the frame in ground supported configuration, j) removing the nozzle from a holder on the frame and extending the second conduit with the nozzle to a position wherein the nozzle is directed to the body or bodies to be cleaned, k) and operating the pump with the nozzle open to deliver a pressurized deionized water spray stream to said body or bodies.

Additionally, the method contemplates provision of multiple wash stations, and operating the apparatus at successive wash stations for selected use. The vessel is typically removed from the frame when the water deionizing capability of the bed is reduced substantially; and providing and connecting a substitute bed containing vessel onto the frame for use with said pump and nozzle, as referred to.

These and other objects and advantages of the invention, as well as the details of an illustrative embodiment, will be more fully understood from the following specification and drawings, in which:

DRAWING DESCRIPTION

FIG. 2 is an enlarged view taken on lines 2—2 of FIG. 1;

FIG. 3 is an elevation taken on liens 3—3 of FIG. 2;

FIG. 4 is an elevation taken on lines 4—4 of FIG. 2;

FIG. 5 is a horizontal section taken on lines 5—5 of FIG. 3;

FIG. 6 is a schematic view of apparatus embodying the invention; and

DETAILED DESCRIPTION

Figure 1:
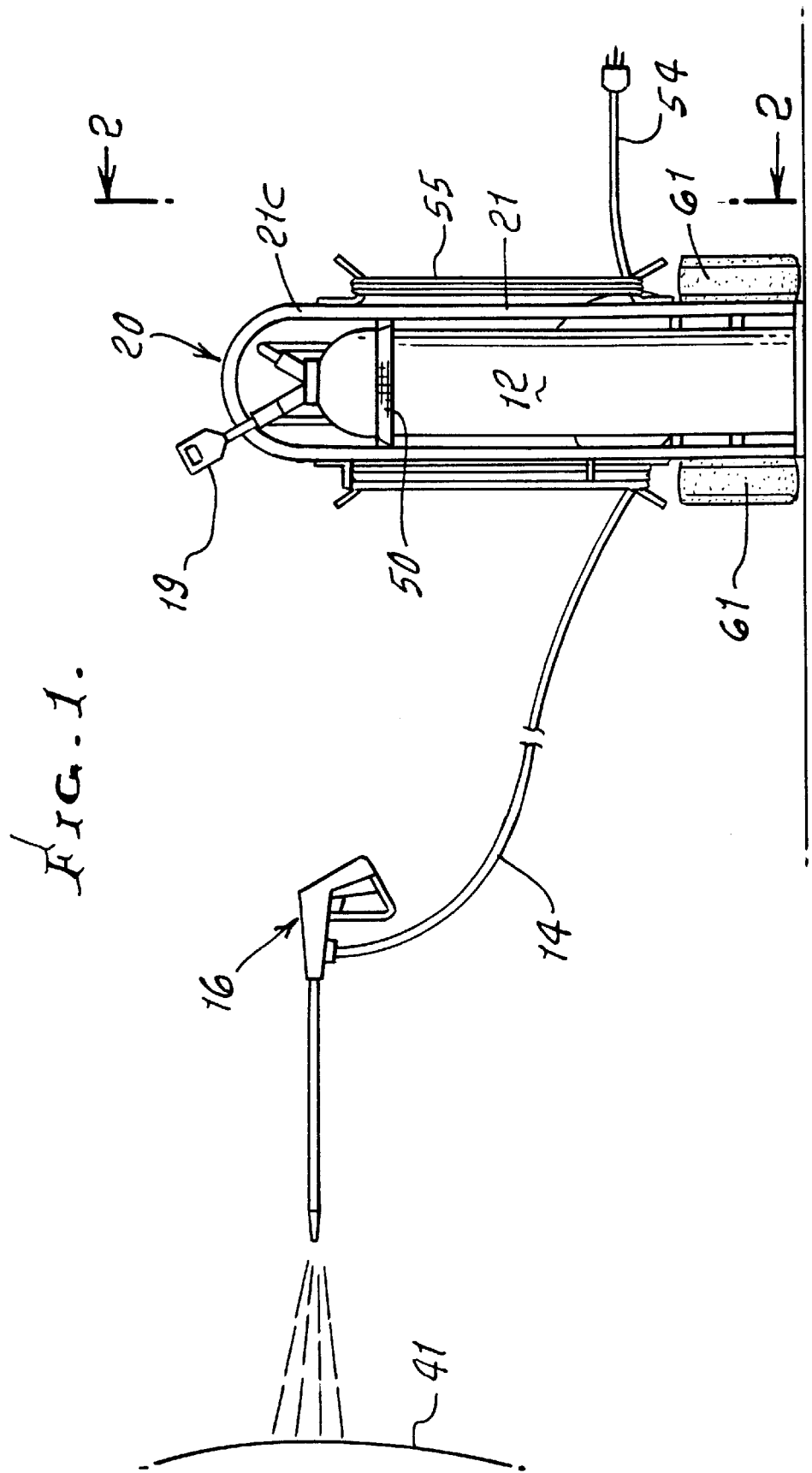
FIG. 1 is an elevation showing one type of preferred apparatus embodying the invention.

In the apparatus or system of FIG. 6, input water 10 such as tap water supplied by city mains, is at less than 100 psi, and flows at 11 to the top of a tank 12. The water flows downwardly at 12a within the tank, to subsequently flow upwardly through a deionization bed 13, one example being ZEOLITE. The deionized water above the bed flows from the top of the tank into a conduit 14 for removal from the top of the tank, and flow at 14a to the input 15a of a pump 15. A drive 30 as for example may include a pump motor, drives the centrifugal pump to deliver water at output 15b, at a high pressure level of at least about 1200 psi. The pressurized de-ionized water then flows via conduit 14c to the input 16a of a spray nozzle 16. A hand control 17 may be provided at the nozzle, for ON-OFF operation. Otherwise, or additionally, a manually operated ON-OFF control valve is employed as at 18 in series with conduit 14a, as shown. A mineral contact indicator may be employed at 19, i.e. connected to conduit 14a, for indicating the mineral content of the deionized water flow to the pump. When that mineral level rises to a selected threshold, as indicated at 19a, the tank 12 is typically replaced, or the bed 13 replaced, for effecting reduction of mineral content in line 14 to a lower level, below the threshold.

FIG. 2 shows the above apparatus as carried by a hand truck 20, having an upright frame 21 extending upwardly sidewardly of the upwardly elongated tank 12. The bottom wall 12b of the tank may be located, to engage a floor or other support surface 22, during use of the apparatus. Tank 12 or vessel is at one (rear) side of the frame 21, and pump 15 and drive 30 are located as the opposite side of the frame, and supported on projecting frame platform 21a, for maximum stability. The tank 12 may be strap-connected as at 50 to frame struts 21c for ease of removal and re-placement. A hose input connection is seen at 53.

A holder such as a receptacle or jacket 28 is carried by the frame to removably receive the nozzle 16, as during non-use. The nozzle is operable to controllably dispense a high pressure stream of deionized water for highly effective cleaning of said bodies. A power input line 54 may be wrap-connected to the frame, at 55.

Figure 7:
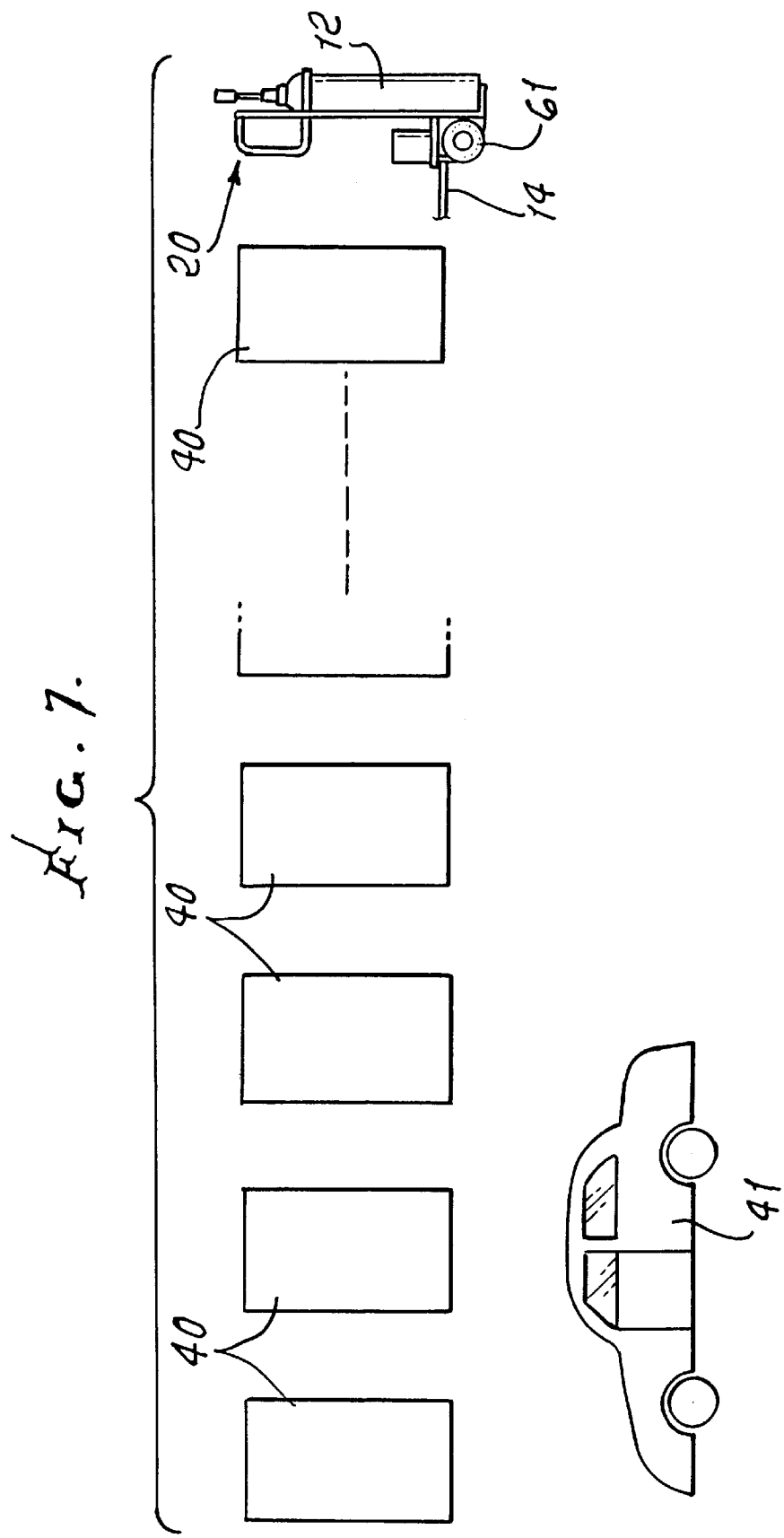
FIG. 7 is a schematic view showing multiple work stations, with the FIG. 1 apparatus being transferred between them, for use.

FIG. 7 shows several work stations 40, at different locations, and between which the hand truck 20 may be wheeled, for operation to clean bodies 41 such as vehicle bodies, by pressurized deionized water spray, from the nozzle. Frame wheels 61 are located below said pump and platform when the tank extends generally vertically, as seen in FIG. 2.

Operation includes the following steps:

$X_1$) wheeling the hand truck carrying the vessel, conduits, pump and nozzle to said operating location, $X_2$) orienting the hand truck in upright position, with the vessel located at one side of the frame in ground supported configuration, $X_3$) removing the nozzle from a holder on the frame and extending said conduit 14c with the nozzle to a position wherein the nozzle is directed toward said body or bodies, $X_4$) and operating the pump with the nozzle open to deliver a pressurized deionized water spray stream to said body or bodies, for cleaning.

A further step comprises determining when the deionization level of water delivered from the vessel is below a selected threshold, removing said vessel from the frame, and connecting a substitute vessel to the frame, the substitute vessel containing a fresh deionization bed. More specifically, such operation includes removing the vessel from the frame when the water deionizing capability of the bed is reduced substantially and providing and connecting a substitute bed containing vessel onto the frame for use with said pump and nozzle, as referred to.

The disclosure of U.S. patent application Ser. No. 09/415,076 is incorporated herein, by reference.

We claim:

1. A system to produce a high pressure stream of deionized water, for cleaning a body or bodies, comprising, in combination:
    a) a deionization bed within a first vessel,
    b) a first conduit or conduits to conduct non-deionized water at a relatively low pressure or pressures to pass through the bed to deionize the water,
    c) a primary sensor to measure the deionization level of water that has passed through the bed,
    d) a second conduit or conduits to conduct water from the bed,
    e) a pump to receive water passed by the second conduit or conduits and to pressurize said received water to a level of at least about 1,200 PSI,
    f) a nozzle connected to the pump and operable to controllably dispense a high pressure stream of deionized water for highly effective cleaning of said bodies,
    g) and a hand truck carrying said vessel, conduits, pump and nozzle for transporting same to the location of said body or bodies.

2. The combination of claim 1 wherein said vessel is elongated upwardly, and said hand truck has a frame that extends upwardly to support said vessel, and there being wheels carrying said frame.

3. The combination of claim 1 wherein there is a platform integral with the frame, and the pump is carried by said platform, generally sidewardly of said vessel.

4. The combination of claim 1 including means on the frame to support the second conduit or conduits, the second conduit or conduits being flexible.

5. The combination of claim 1 including a receptacle on the frame to removably receive said nozzle.

6. The combination of claim 3 wherein said vessel is a tank located at one side of the frame and rearwardly attached to that frame, and said pump is located at the opposite side of the frame.

7. The combination of claim 6 wherein there are wheels for carrying said frame during transport, said wheels located below said pump and platform when the tank extends generally vertically.

8. The combination of claim 7 wherein the wheels and pump are located proximate a lower side of the vessel.

9. The combination of claim 1 wherein the pump is connected to receive deionized water from the vessel at a pressure of less than 100 psi, and is operable to pressurize the received water to a level of at least about 1,200 psi.

10. The method of cleaning a body or bodies at a particular location, and using apparatus that includes:
    a) a deionization bed within a first vessel,
    b) a first conduit or conduits to conduct non-deionized water at a relatively low pressure or pressures to pass through the bed to deionize the water,
    c) a primary sensor to measure the deionization level of water that has passed through the bed,
    d) a second conduit or conduits to conduct water from the bed,
    e) a pump to receive water that has passed through the second conduit or conduits and to pressurize said received water to a level of at least about 1,200 psi,
    f) a nozzle connected to the pump and operable to controllably dispense a high pressure stream of deionized water for highly effective cleaning of said bodies,
    g) and a hand truck carrying said vessel, conduits, pump and nozzle for transporting same to the location of said body or bodies,
    h) the hand truck including a wheeled frame, said method including
    i) wheeling the hand truck carrying the vessel, conduits, pump and nozzle to said location,
    j) orienting the hand truck in upright position, with the vessel located at one side of the frame in ground supported configuration,
    k) removing the nozzle from a holder on the frame and extending said second conduit with the nozzle to a position wherein the nozzle is directed to said body or bodies,
    l) and operating the pump with the nozzle open to deliver a pressurized deionized water spray stream to said body or bodes.

11. The method of claim 10 including connecting a source of low pressure water to said first conduit or conduits.

12. The method of claim 10 including determining when the deionization level of water delivered from the vessel is below a selected threshold, removing said vessel from the frame, and connecting a substitute vessel to the frame, the substitute vessel containing a fresh deionization bed.

13. The method of claim 10 including removing the vessel from the frame when the water deionizing capability of the bed is reduced substantially and providing and connecting a substitute bed containing vessel onto the frame for use with said pump and nozzle, as referred to.

* * * * *